United States Patent [19]
Cheshire et al.

[11] Patent Number: 5,326,020
[45] Date of Patent: Jul. 5, 1994

[54] RIGID PAPERBOARD CONTAINER

[75] Inventors: James O. Cheshire, Neenah; Mark B. Littlejohn; Denny R. Garns, both of Appleton; Erland S. Sandstrom, Menasha, all of Wis.

[73] Assignee: James River Corporation of America, Richmond, Va.

[21] Appl. No.: 126,900

[22] Filed: Aug. 31, 1993

Related U.S. Application Data

[63] Continuation of Ser. No. 937,708, Sep. 1, 1992, abandoned.

[51] Int. Cl.⁵ ............................................... B65D 1/34
[52] U.S. Cl. .................................. 229/2.5 R; 220/657
[58] Field of Search ..................... 229/2.5 R; 220/657, 220/659

[56] References Cited

U.S. PATENT DOCUMENTS

| | | |
|---|---|---|
| 1,743,865 | 1/1930 | Pilgrim . |
| 2,348,725 | 5/1944 | Chaplin . |
| 2,365,331 | 12/1944 | Carter . |
| 2,832,522 | 4/1958 | Schlanger . |
| 3,401,863 | 9/1968 | Earl . |
| 3,684,633 | 8/1972 | Haase . |
| 4,606,496 | 8/1986 | Marx et al. . |
| 4,609,140 | 9/1986 | Van Handel et al. . |
| 4,721,499 | 1/1988 | Marx et al. . |
| 4,721,500 | 1/1988 | Van Handel et al. . |
| 5,088,640 | 2/1992 | Littlejohn . |

FOREIGN PATENT DOCUMENTS

| | | |
|---|---|---|
| 1253019 | 12/1960 | France . |
| 2232286 | 1/1975 | France . |
| 1326005 | 8/1973 | United Kingdom . |

OTHER PUBLICATIONS

U.S. application Ser. No. 07/755,768, Filed: Sep. 6, 1991.
U.S. application Ser. No. 07/386,021, Filed: Jul. 28, 1989, Now Abandoned (FWC of 07/136,126).
U.S. application Ser. No. 07/136,126, Filed: Dec. 21, 1987, Now Abandoned (Parent of Ser. No. 07/386,021).

Primary Examiner—Gary E. Elkins
Attorney, Agent, or Firm—Sixbey, Friedman, Leedom & Ferguson

[57] ABSTRACT

A container formed from a unitary paperboard blank having a substantially planar inner region, a sidewall region and a rim region formed about the periphery thereof is disclosed. The sidewall region includes a generally annular region flaring upwardly and outwardly from a periphery of the planar inner region and a first frusto-conical region adjoining the annular region with the frusto-conical region sloping outwardly and upwardly from the annular region. The rim region includes an outwardly flaring arcuate annular region adjoining an outer periphery of the first frusto-conical region, and a second frusto-conical region extending substantially tangentially from the arcuate annular region. The second frusto-conical region extends outwardly and downwardly at an angle of about 6° to about 12° and preferably about 6°–10.5° relative to the plane defined by the planar inner region. The rim of the container may further include an outwardly and downwardly flaring frusto-conical lip adjoining an outer periphery of the second frusto-conical region in order to aid in grasping of the paperboard container by the consumer. Additionally, a plurality of radially extending mutually spaced pleats are also formed in the rim region and are internally bonded with portions of the rim region during formation of the paperboard container by a die press. During the fabrication of the paperboard material for forming the aforementioned container, the paperboard material is impregnated with a sizing adhesive equivalent to at least 6 pounds of starch per 3,000 ft² ream of paperboard material such that during the press forming of the paperboard containers between respective dies, the pleats adhere to respective portions of the pleats and rim, thereby maintaining the integrity of the pleats during use of the container by the consumer by resisting the opening of the pleats.

35 Claims, 7 Drawing Sheets

RIGID PAPERBOARD CONTAINER

This application is a continuation of Ser. No. 07/937,708, filed Sep. 1, 1992, now abandoned.

TECHNICAL FIELD OF THE INVENTION

The present invention relates generally to the formation of paperboard containers, more particularly, the present invention relates to the formation of pressed paperboard plates or trays having a high resistance to bending.

BACKGROUND OF THE INVENTION

Formed fiber containers, such as paper plates and trays, are commonly produced either by molding fibers from a pulp slurry into the desired form of the container or by pressing a paperboard blank between forming dies into the desired shape. The molded pulp articles, after drying, are fairly strong and rigid but generally have rough surface characteristics and are not usually coated so that they are susceptible to penetration by water, oil and other liquids. Pressed paperboard containers, on the other hand, can be decorated and coated with a liquid-proof coating before being stamped by the forming dies into the desired shape. Pressed paperboard containers generally cost less and require less storage space than the molded pulp articles. Large numbers of paper plates and similar products are produced by each of these methods every year at relatively low unit cost. These products come in many different shapes, rectangular or polygonal as well as round, and in multicompartment configurations.

Pressed paperboard containers tend to have somewhat less strength and rigidity than do comparable containers made by the pulp molding processes. Much of the strength and resistance to bending of a plate-like container made by either process lies in the sidewall and rim areas which surround the center or bottom portion of the container. When in use, such containers are supported by the rim and sidewall while the weight held by the container is located on the bottom portion. Thus, the rim and sidewall generally are placed in tension and flexure when the container is being used.

In plate-like structures made by the pulp molding process, the sidewall and overturned rim of the plate are unitary, cohesive fibrous structures which have good resistance to bending as long as they are not damaged or split. Because the rim and sidewall of the pulp molded containers are of a cohesive, unitary structure, they may be placed under considerable tension and flexure without failing.

In contrast, when a container is made by pressing a paperboard blank, the flat blank must be distorted and changed in area in order to form the blank into the desired three dimensional shape. This necessary distortion results in seams or pleats in the sidewall and rim, the areas of the container which are reduced in press forming the container. These seams or pleats constitute material fault lines in the sidewall and rim areas about which such containers bend more readily than do containers having unflawed sidewalls and rims. Moreover, such seams or pleats have a tendency to return to their original shape—flat. The necessary location of these pleats in the sidewall and rim of pressed paperboard containers places the greatest weakness in the area requiring the greatest strength. Such containers have been unable to support loads comparable to pulp molded containers since, when in use, the greater the load is, the higher the stress imposed on the rim and sidewall. Imposing tension, flexure or torsion on pleats merely enhances their tendency to open. Accordingly, known pressed paperboard containers have significantly less load carrying ability than do pulp molded containers. Being less costly than an equivalent pulp molded plate, a pressed paperboard plate with comparable strength and rigidity would have significant commercial value.

Many efforts have been made to strengthen pressed paperboard containers while accommodating the necessary reduction in area at the sidewalls and rims. Blanks from which paperboard containers are pressed have been provided with score lines at their periphery to eliminate the random creation of seams or pleats. The score lines define the locations of the seams or pleats. Score lines, sometimes in conjunction with special die shapes, have been used to create flutes or corrugations in the sidewall and rim for aesthetic and structural purposes. The additional cost and complexity of dies used to create flutes or corrugations in the sidewall of such containers presents a cost disadvantage which may not be entirely justified.

Whether the area reduction of the sidewall and rim is accommodated by pleats, seams, flutes or corrugations, the basic difficulty has been that under limited stress the paperboard will tend to return to its original shape.

To overcome this tendency, it has been suggested that the rim be subjected to various strengthening techniques. The earliest efforts comprised the addition of several thicknesses of paperboard at the rim. This container, however, required additional manufacturing steps and increased the cost and required storage space of the containers.

More recently, as disclosed in commonly assigned U.S. Pat. No. 4,609,140 issued to Van Handel et al., improved rigidity in a pressed paperboard container has been achieved by application of pressure and temperature to the rim of the container while applying substantially no pressure to the sidewall and bottom wall. In particular, the container had a generally planar bottom wall, a sidewall upwardly rising from the bottom wall periphery and an overturned rim extending from the sidewall periphery. During integrally press-forming of the container, substantially no pressure was applied to the bottom and sidewalls and pressure was applied to the overturned rim. The amount of pressure imposed on the rim was approximately 200–250 psi and gradually increased from the juncture of the rim and sidewall to the peripheral edge of the rim. The pleats formed in the rim were compressed to the thickness of the rim while the pleats formed in the sidewall were not subjected to any significant pressure. The container thus formed provided a significant improvement over prior paperboard containers. Additionally, commonly assigned U.S. Pat. No. 4,606,496 issued to Marx et al. discloses an improvement over that set forth hereinabove. Therein, a container is disclosed which includes densified regions radially extending through and circumferentially spaced about annular sections of the rim. The densified regions are formed from pleats including at least three layers of paperboard which are created during press forming of the blank into a container, the rim region being subjected to sufficient pressure to form the pleats into cohesive fibrous structures having a density substantially greater than the density of the area of the rim adjacent the pleats while still being of substantially the same thickness.

While the paperboard container formed in accordance with that process set forth in U.S. Pat. No. 4,606,496 exhibits a greater rigidity than that of the remaining prior art, the containers do not have the strength of pulp molded containers, thus, there remains a need for yet a stronger, more stable pressed paperboard container which will reliably resist bending when food is placed thereon by the consumer. Further, there is clearly a need for a stronger, more rigid paperboard container which resists bending and which can be manufactured in a cost effective manner.

SUMMARY OF THE INVENTION

A primary object of the present invention is to overcome the aforementioned shortcomings associated with prior rigid paperboard containers.

A further object of the present invention is to provide a paperboard container in the form of a paper plate having a rim and sidewall configuration which better withstands a load force placed thereon when being held by the consumer with either one or two hands.

Yet another object of the present invention is to provide a paperboard container having a plurality of opening-resistant radially extending pleats mutually spaced about a sidewall and rim portion of the container for enhancing the rigidity thereof, so that the paperboard container has substantially equivalent strength and rigidity to a pleatless container, preferably having rigidity of at least 80% of that of a pleatless container.

Another object of the present invention is to provide a paperboard material which when formed into the aforementioned paperboard container aids in the completion and maintenance of the pleats formed in the rim and sidewall portion thereof.

These as well as additional objects of the present invention are achieved by forming a container from a unitary paperboard blank with the container having a substantially planar inner region, a sidewall region and a rim region formed about the periphery of the planar region. The sidewall region includes a generally annular region flaring upwardly and outwardly from a periphery of the planar inner region and a first frusto-conical region adjoining the annular region with the frusto-conical region sloping outwardly and upwardly from the annular region. The rim region includes an outwardly flaring arcuate annular region adjoining an outer periphery of the first frusto-conical region of the sidewall and further includes a first portion thereof extending generally outwardly and upwardly from the first frusto-conical region and a second portion thereof flaring generally downwardly and outwardly at an angle between about 6° to about 12° relative to a plane defined by the planar inner region. Extending downwardly and outwardly from the second portion of the arcuate annular region is a second frusto-conical region which extends substantially tangentially from the second portion of the arcuate annular region. That is, the second frusto-conical region extends at an angle of about 6° to about 12° and preferably about 10.5° relative to the plane defined by the planar inner region. The rim of the container may further include an outwardly and downwardly flaring frusto-conical lip adjoining an outer periphery of the second frusto-conical region in order to aid in grasping of the paperboard container by the consumer.

A plurality of radially extending mutually spaced pleats are also formed in the sidewall and rim region and are pressed closed during formation of the paperboard container by a die press. By radially extending pleats, it is meant any pleats having a sufficient radial component that a sufficient reduction in area be accomplished in the portions of the board at the outer periphery of the blank. Additionally, during the fabrication of the paperboard material for forming the aforementioned container or subsequently thereto, the paperboard material may be impregnated with sizing adhesive in an amount equivalent to least 6 pounds of starch per 3,000 ft$^2$ ream of paperboard material and preferably, the paperboard material is impregnated with the equivalent of approximately 13 pounds of starch per 3000 ft$^2$ ream of paperboard material. Surprisingly, the effect of increased size adhesive weight causes an unexpected increase in the ability of the pleats to resist opening when subjected to stresses during use. In many cases, pleat bonding can be improved to such a degree that the resulting container will have a strength substantially equivalent to that of an equivalent pleatless container, and often having over 80% or 90% of the strength of an equivalent pleatless container.

These as well as additional advantages of the present invention will be become more apparent from the following "Detailed Description of the Preferred Embodiment" when read in light of the several figures.

DETAILED DESCRIPTION OF THE PREFERRED EMBODIMENT

Reference will now be made in detail to the preferred embodiment of the present invention, an example of which is set forth in the above noted drawings. In accordance with the present invention, the paperboard container comprises a substantially planar inner region, a sidewall region and a rim region adjoined to and extending about the periphery of the planar inner region.

The container of the present invention may be formed into a plate or bowl thus having a circular configuration or such container may be square or rectangular in shape having angular corners, such as a tray. Further, additional shapes are contemplated including compartmented trays and plates as well as oval platters. In each contemplated embodiment, all corners are rounded or curved with the preferred embodiment of the present invention being depicted in FIG. 1.

Figure 1:
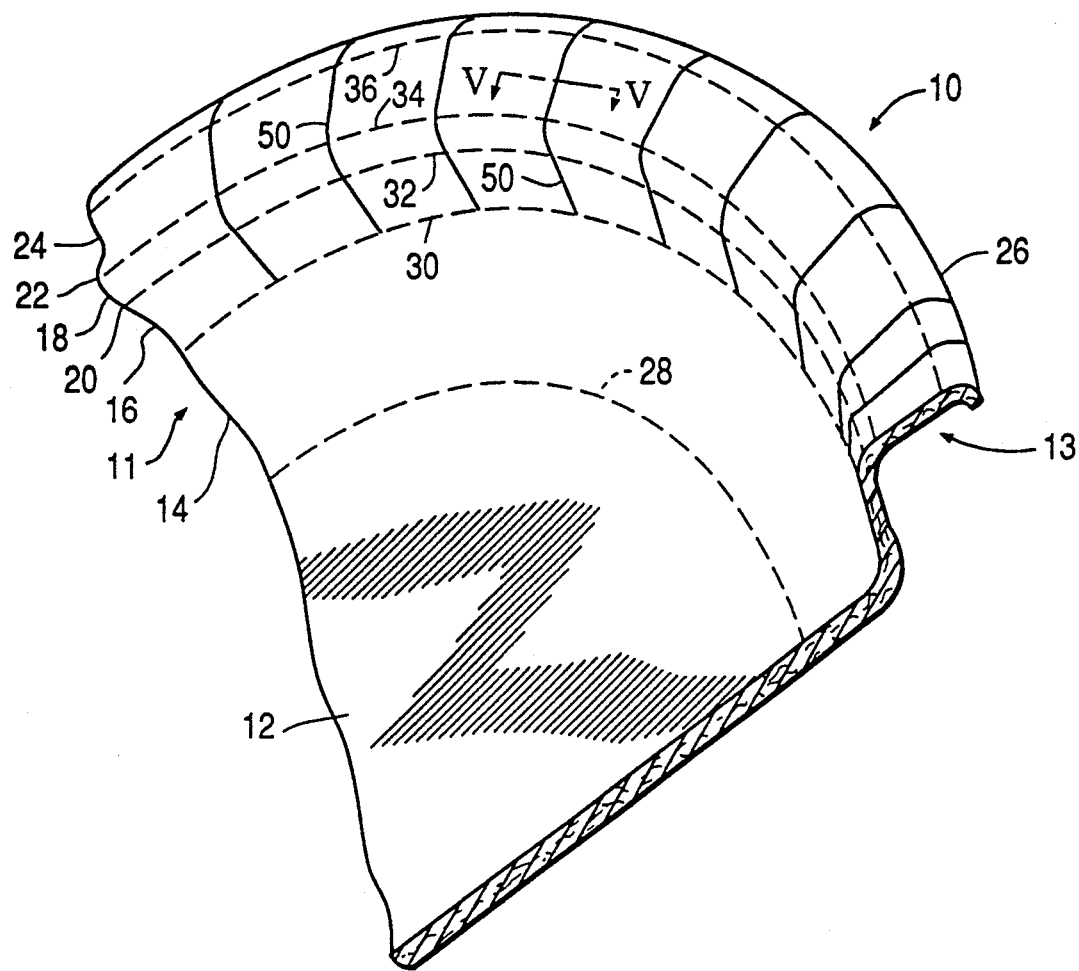
FIG. 1 is a perspective view of a section of a plate-like container formed in accordance with the present invention.
Figure 2:
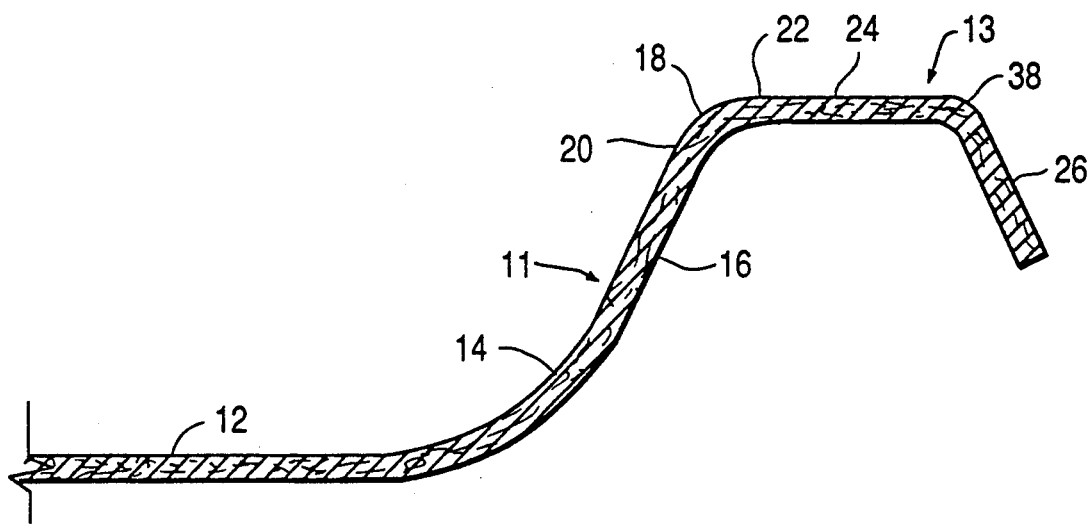
FIG. 2 is a radial cross-section of the container illustrated in FIG. 1.

As is illustrated in FIG. 1, the container 10 includes a substantially planar inner region 12 which is surrounded about its periphery by a sidewall region 11 and adjoining rim region 13. The sidewall region 11 includes a generally annular region 14 which flares upwardly and outwardly from a periphery of the planar inner region 12 and a first frusto-conical region 16 which slopes upwardly and outwardly from a periphery of the annular region 14. In the rim region 13, outwardly flaring arcuate annular region 18 adjoining an outer periphery of the first frusto-conical region is provided with: first portion 20 thereof extending generally upwardly from the first frusto-conical region 16; and second portion 22 thereof flaring generally downwardly outwardly at an angle relative to the plane defined by the planar inner region 12. Second frusto-conical region 24 extends substantially tangentially from the second portion 22 of the arcuate annular region 18 and thus extends downwardly and outwardly from the second portion 22 of the arcuate annular region 18 at an angle relative to the plane defined by the planar inner region 12. Adjoining the outer periphery of the second frusto-conical region 24 is an outwardly and downwardly flaring frusto-conical lip 26 which both adds significantly to strength and aids the consumer in grasping the periphery of the container 10. The phantom lines 28, 30, 32, 34 and 36 illustrated in FIG. 1 are provided for ease in identifying the various structural segments of the container and do not represent lines actually appearing on the container. Moreover, the phantom lines do not represent actual demarcations between the sections in that, as explained in greater detail hereinbelow, the size relationships between the segments may vary without departing from the spirit and scope of the present invention. Additionally, as is illustrated in FIG. 2, the container is formed from an integral and unitary paperboard blank.

Figure 3:
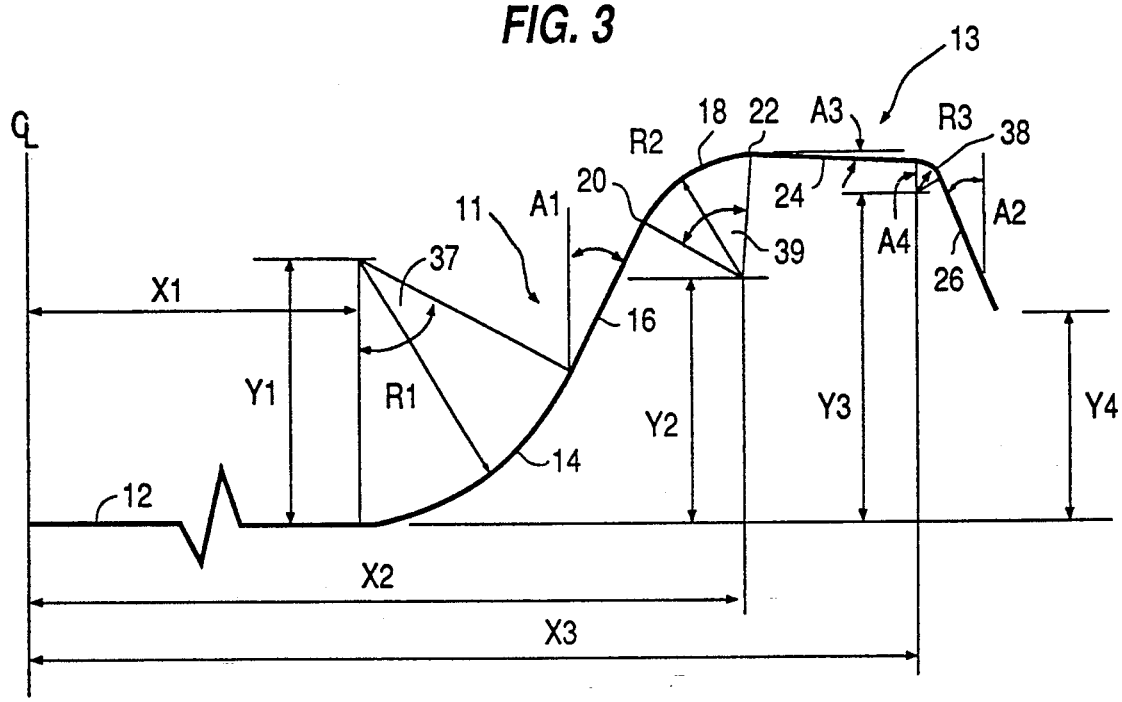
FIG. 3 is a graphic representation of the radial cross-sectional shape of the container formed in accordance with the present invention.

Referring now to FIG. 3, the particular configuration of the sidewall and rim portions will be explained in greater detail.

FIG. 3 is a diagrammatic view of the cross section of the rigid paperboard container illustrated in FIG. 1 beginning from the center line of the container. Throughout the following description, each of the dimensions are referenced with respect to a given diameter D which in accordance with the present invention as illustrated in FIG. 3 is approximately 8.75 inches. However, the particular diameter of the paperboard container is not a critical limitation and is only set forth herein by way of example. It is the relationship between the various portions of the rim configuration which are essential to the present invention.

The planar inner region 12 in accordance with the illustrated embodiment has a radius X1 which is equal to approximately 0.3 D–0.4 D and preferably 0.348 D. Adjoining an outer periphery of the planar inner region 12 is a sidewall portion 11 including annular region 14 having a radius of curvature equal to approximately 0.05 D–0.06 D and preferably 0.0572 D with the center point thereof being positioned a distance Y1 from the planar inner region 12. Included angle 37 of the annular region 14 is from about 40° to about 70° and preferably about 60°–65° or approximately 62°. Adjoining the periphery of the annular region 14 is the first frusto-conical region 16 which slopes upwardly at an angle A1 with respect to the vertical from about 20° to about 35° and preferably about 25°–30° or approximately 27.5°. Additionally, the frusto-conical region 16 is of a length greater than about 0.015 D, preferably from about 0.025 D to 0.05 D and more preferably approximately 0.036 D. Further, adjoining the first frusto-conical region 16 is the arcuate annular region 18 which includes a radius of curvature in the range of 0.015 D to 0.03 D and preferably approximately 0.024 D with the center point thereof being positioned a distance Y2 from the planar inner region 12. The included angle 39 of the arcuate annular region 18 may range from about 61° to about 82° and is preferably 66° to 77° or about 73°. The second portion 22 of the arcuate annular region 18, that is the distal portion of the arcuate annular region 18, is positioned such that a line tangent to the curvature of the arcuate annular region 18 at the second portion 22 slopes downwardly and outwardly at an angle of approximately 6° to 12° and preferably approximately 10.5°.

With the present invention, it is critical that the combination of the annular region 14 and arcuate annular region 18 combine to position the second portion 22 of the arcuate annular region 18 in the manner set forth herein above. That is, the included angle 37 of the annular region 14 when combined with the included angle 39 of the arcuate annular region 18 with the first frusto-conical region 16 spanning therebetween, positions the second portion 22 of the arcuate annular region 18 in a manner such that second frusto-conical region 24, which extends substantially tangentially from the distal end of the second portion 22 of the arcuate annular region 18 extends outwardly and downwardly at an angle of about 6° to 12° and preferably about 10.5°. The second frusto-conical region 24 is of a length in a range from about 0.03 D to about 0.05 D and is preferably 0.04 D. Because the second frusto-conical region 24 extends substantially tangentially from the second portion 22 of the arcuate annular region 18, the second frusto-conical region 24 extends outwardly and downwardly at an angle in the range from approximately 6° to 12° and preferably extends at an angle A3 of approximately 6°–10.5° with respect to a horizontal plane formed by the planar inner region 12.

Adjoining an outer periphery of the second frusto-conical region 24 is the lip 26 which is in the form of yet another frusto-conical region which extends outwardly and downwardly from the second frusto-conical region 24. The lip 26 is of a length of at least 0.005 D and is preferably approximately 0.010 D. Further, the lip 26 extends at an angle A2 of no more than 45° from vertical, preferably approximately 15° to 30° with respect to the vertical plane and more preferably approximately 22.5°.

At the transition between the second frusto-conical region 24 and the lip 26 is a transition region 38. The transition region 38 includes a radius of curvature R3 which is in the range of about 0.008 D and 0.01 D and is preferably approximately 0.0092 D with the center point thereof being positioned a distance Y3 from the planar inner region 12. Additionally, the transition region 38 has an included angle A4 of approximately 48° to 70° and preferably approximately 57°.

Figure 4:
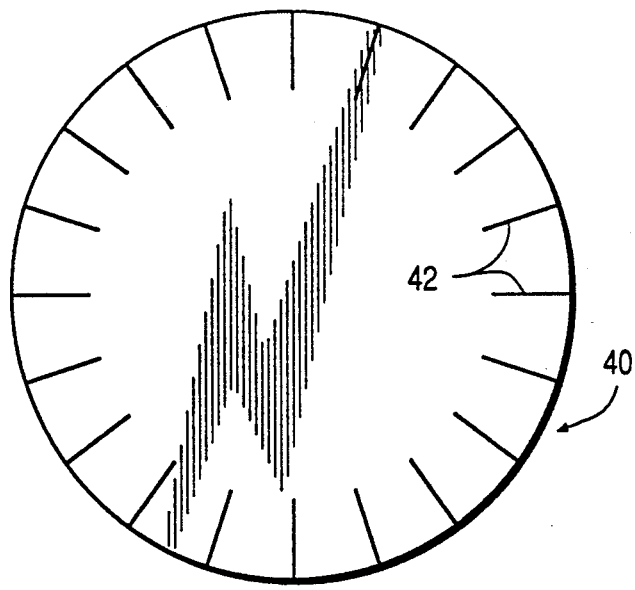
FIG. 4 is a plan view of a blank for forming the plate-like container in accordance with the present invention.

Referring now to FIG. 4, the blank 40 is of the type generally used to form circular containers such as plates and bowls. Preferably the blank includes a plurality of radially extending score lines 42 mutually spaced about the periphery of the blank 40. The score lines define locations at which pleats are created in the sidewall and rim portions during the forming the container. The number of score lines 42 may vary between 10 and 100 for a circular container depending on the rigidity desired and on the radius and height of the container. The pleats formed by the radial score lines 42 may begin in the generally annular region 14 and extend through the first frusto-conical region 16 of the formed container 10 to the outer periphery of the container.

The paperboard blank is formed into a rigid paperboard container in accordance with that process set forth in commonly assigned U.S. Pat. No. 4,606,496, the contents of which are incorporated herein by reference. When forming the container, the paperboard blank is press formed between male and female die surfaces which define the shape and thickness of the container. Preferably, at least one die surface is heated so as to maintain a temperature during press forming of the blank of 200° F. to 400° F.

Figure 5:
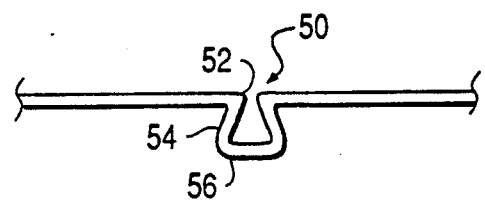
FIG. 5 is a cross-sectional view of a pleat taken along line V—V before pressing of the pleat against the respective portion of the rim of the container.
Figure 6:
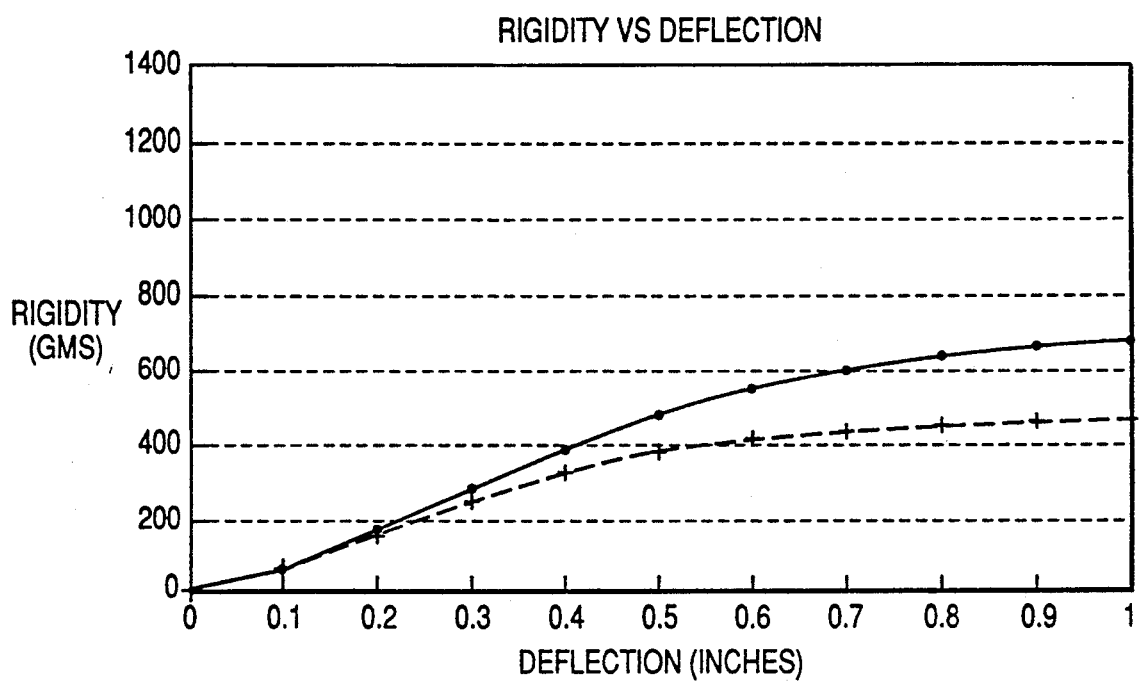
FIGS. 6–8 are graphic illustrations of the rigidity of the paperboard container formed in accordance with the present invention as compared to prior containers.
Figure 7:
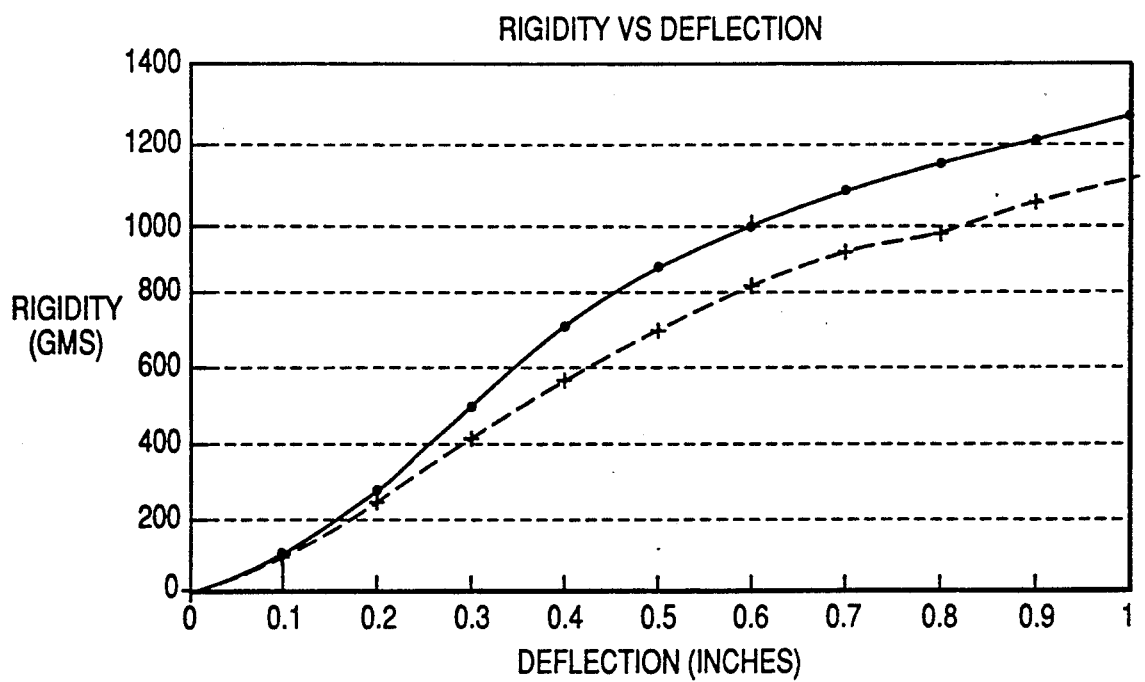
Figure 8:
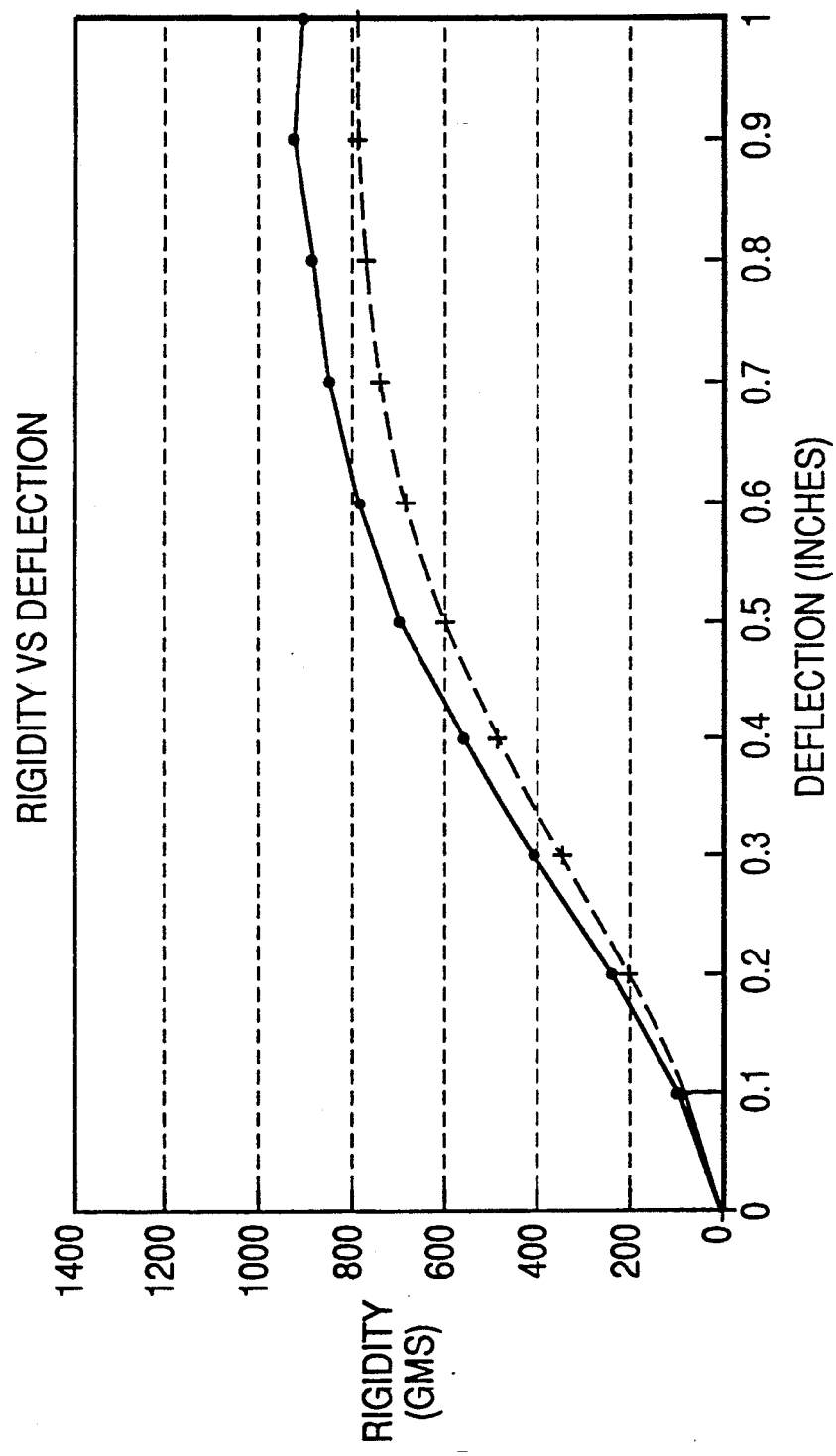

Referring now to FIG. 5, FIG. 5 is a cross-section taken along line V—V of FIG. 1 and represents formation of a pleat in sidewall 11 and rim 13 of container 10. Upon initiation of the forming process, pleats 50 pass through the configuration illustrated schematically in FIG. 5. As can be seen from FIG. 5, during formation of the container, three overlapping layers 52, 54, and 56 of paperboard material fold into an upside down "Ω" (upper case omega) centered about each of score lines 42, thereby forming incipient pleats centered on each of score lines 42. When subjected to pressure, heat and moisture during the formation of paperboard container 10; layers 52, 54, and 56 of the paperboard material created by the score lines are forced into close proximity to one another and laminae within the board adjacent to the pleats slip and deform relative to each other. In one embodiment of the invention, the boardstock used contains only the usual amounts of starch typically used in platestock of about 3 lbs per 3000 sq. ft. ream. In such cases as shown in FIGS. 6–8, the plate formed will exhibit greater rigidity than plates having known prior art configurations wherein the second frusto-conical region 24 is substantially horizontal. In accordance with a preferred embodiment of the subject invention, the paperboard stock material is impregnated with sizing adhesives in an amount equivalent to from about at least 6 to about 20 lb/ream of starch per 3,000 sq. ft. ream of paperboard material, preferably in an amount equivalent to 13 pounds of starch per 3,000 sq. ft. ream of paperboard material. Normal practice in formulation of paperboard for containers has generally been to limit the amount of starch used to about 3 to 5 lbs. because bending stiffness at a given basis weight is thought to pass through a maximum in the vicinity of this region. Such sizing adhesives are preferably applied to the paperboard material at the size press and forced into the paperboard during the formation of the paperboard stock material. The sizing adhesive is preferably applied to both surfaces of the paperboard material. Sizing adhesive may be incorporated into the containers of the present invention by any convenient method which serves to impregnate portions of the board in the vicinity of the pleats with enough sizing adhesive to increase the resistance of the pleats to pleat opening above the resistance to pleat opening experienced in standard grades of boardstock wherein approximately 3–5 lbs/ream of starch are incorporated. It is believed that the sizing adhesive internally locks the deformed laminae into the desired configuration. As mentioned, the most preferred method of adding sizing adhesive is to add it to the board during manufacture as it passes through the size press. Although the board may be thoroughly permeated with sizing adhesive, it does not appear necessary to do so. It is, however, desirable to achieve a substantial degree of penetration into the board as the available evidence suggests that the major contribution arises from the improvement in internal bonding within the board forming the pleats. We have found that significant improvement in plate rigidity can result when sizing adhesive is merely "painted" onto the pleats on the non-food-contact side of the plate and cured.

Accordingly, during the formation of the paperboard container 10 by the male and female dies, temperature, pressure and moisture are controlled in the region of pleats 50 such that pleats 50 become much more resistant to opening than they would be if board having normal levels of starch were used. Ideally the amount of sizing adhesive will be sufficient that pleat bonding can be improved to such a degree that the resulting container will have a strength substantially equivalent to that of an equivalent pleatless container, preferably having over 80% or 90% of the strength of an equivalent pleatless container. It appears that several effects may contribute to making pleats so much more resistant to opening. Microscopic analysis of formed pleats suggest that one of the primary benefits is probably bonding which is internal to the board, that is, between the plies of the board rather than between adjacent surfaces of the board. On the food contact surface of the container, it appears that the presence of coating pigment and polymer may interfere with bonding between adjoining sections of the surface of the board but; on the other surface, bonding between adjoining portions of the board surfaces in the pleat may be rather more significant. The sizing adhesive also seems to increase the tensile stiffness of the board (while slightly sacrificing bending stiffness) in the sections between the pleats. Available evidence suggests that this effect is probably secondary in comparison to the effect of internal bonding upon resistance to opening of the pleats.

By impregnating the paperboard stock material with a sufficient amount of a size adhesive as referred to herein above, the basis weight of the paperboard material may be reduced while achieving the same rigidity as with the prior art paperboard containers formed from heavier board. Alternatively, the same basis weight of paperboard material may be used and thus a significantly greater rigidity would be achieved in accordance with the present invention. With the present invention for many paperboard products, a basis weight reduction of approximately 22% at constant rigidity may be achieved. That is, with the previous paperboard containers a basis weight of approximately 258 lbs. per 3,000 sq. ft. ream would be required to meet rigidity standards while in accordance with the present invention, a basis weight of approximately 202 lbs. per 3,000 sq. ft. ream is required.

The sizing adhesives suitable for use in the present invention include those materials commonly applied to paperboard which serve to stiffen the board in the pleat regions subsequent to pleat forming. Suitable adhesives seem to serve to lock the displaced laminae into the desired configuration and reduce the tendency of the board or ply separate in the pleat regions subsequent to pleat forming. Typical sizing adhesives include polyvinyl alcohol, carboxymethyl cellulose, naturally occurring gums, sodium silicate, polyvinyl acetate, styrene butadiene, starches, and the like as well as combinations of the foregoing. For economic reasons, starches are the preferred sizing adhesives for use in connection with the present invention. For materials other than starches, the proper amount of sizing adhesive may be determined by production of trial plates and comparing resistance to pleat opening and rigidity of these plates to those incorporating starches in the suggested ranges. In U.S. application Ser. No. 136,126 filed Dec. 20, 1987, entitled "Paperstock Having Improved Properties and Method of Making Improved Paperstock", now abandoned, which is hereby incorporated herein by reference, a similar paperstock material is disclosed.

Numerous plates having configurations set forth in Table I were manufactured in both pilot and commercial scale plate forming presses.

TABLE I

|  | Prior Art horizontal flange | Prior Art 3° negative flange | Present Invention 8° negative flange |
|---|---|---|---|
| R1/D | 0.057 | 0.057 | 0.057 |
| X1/D | 0.349 | 0.349 | 0.349 |
| Y1/D | 0.057 | 0.057 | 0.057 |
| R2/D | 0.027 | 0.026 | 0.024 |
| X2/D | 0.440 | 0.438 | 0.437 |
| Y2/D | 0.051 | 0.051 | 0.052 |
| R3/D | 0.008 | 0.009 | 0.009 |
| X3/D | 0.480 | 0.479 | 0.478 |
| Y3/D | 0.068 | 0.065 | 0.059 |
| Y4/D | 0.062 | 0.059 | 0.054 |
| A1 | 27.5 | 27.5 | 27.5 |
| A2 | 22.5 | 22.5 | 22.5 |
| A3 | 2.5 | 5.5 | 10.5 |

Referring now to FIGS. 6-8, deflection of pressed paperboard plates having an 8° negative flange angle in accordance with the present invention was compared to prior art paperboard plates, the overall geometric configurations being as set forth in Table 1. In each of FIGS. 6-8, data received during tests conducted on the paperboard container in accordance with the present invention is graphically illustrated by the solid line A while that data recorded with respect to prior art paperboard containers is set forth by the interrupted line B. As can be seen from each of FIGS. 6-8, the paperboard container formed in accordance with the present invention exhibits a consistently higher rigidity than that of the prior art containers which were of substantially the same geometric configuration except that the second frusto-conical region 24 was substantially horizontal. In all known prior art containers, the frusto-conical region flared outwardly and downwardly at an angle of less than about 5°.

The data set forth in FIGS. 6-8 was obtained using paperboard material having a starch content of approximately 3-5 lbs per 3,000 sq. ft./ream and thus represents only the contribution to improved rigidity resulting from the geometric configuration. The basis weight of the paperstock material used in forming the plates used in obtaining the data illustrated in FIG. 6 was 171 lbs/ream, while the basis weight of the paperboard stock used in obtaining the data illustrated in FIGS. 7 and 8 were 238 lbs/ream and 206 lbs/ream respectively.

Additional tests were conducted to measure the rigidity of various plates under simulated use conditions in which the plates are held either with one hand (to simulate going through a buffet line for example) or two (to simulate removal from a microwave or sitting with the plate on the knees). The results of these tests are set forth in Tables II and III from which it can be readily appreciated that increasing the negative flange angle to 8° from the prior art of 3° yields a surprising increase in rigidity.

TABLE II

|  | SSI RIGIDITY (ONE HAND) |  | GRAMS PER 1/2 INCH |
|---|---|---|---|
| flange angle | 220 (lbs/ream) | 235 (lbs/ream) | 250 (lbs/ream) |
| −3° | 385 g/0.5" | 407 g/0.5" | 437 g/0.5" |
| −8° | 397 g/0.5" | 479 g/0.5" | 482 g/0.5" |

TABLE III

|  | RIGIDITY (TWO HAND) | g per 0.3 in |
|---|---|---|
| flange angle | 220 lb/ream | 235 lb/ream |
| −3° | 664 g/0.3" | 721 g/0.3" |
| −8° | 760 g/0.3" | 804 g/0.3" |

FIGS. 9-12 illustrate the improved rigidity due to the improved pleat bonding resulting from increased levels of sizing adhesives. Forming efficiency is illustrated for 8 ¾ inch plates having the approximate configurations set forth in Table I and which were formed from 220 lbs. per ream boardstock incorporating various amounts of oxidized corn starch as the sizing adhesive, the amount of starch added varying between 0 and 20 lbs. per ream as indicated in the figures.

Figure 9:
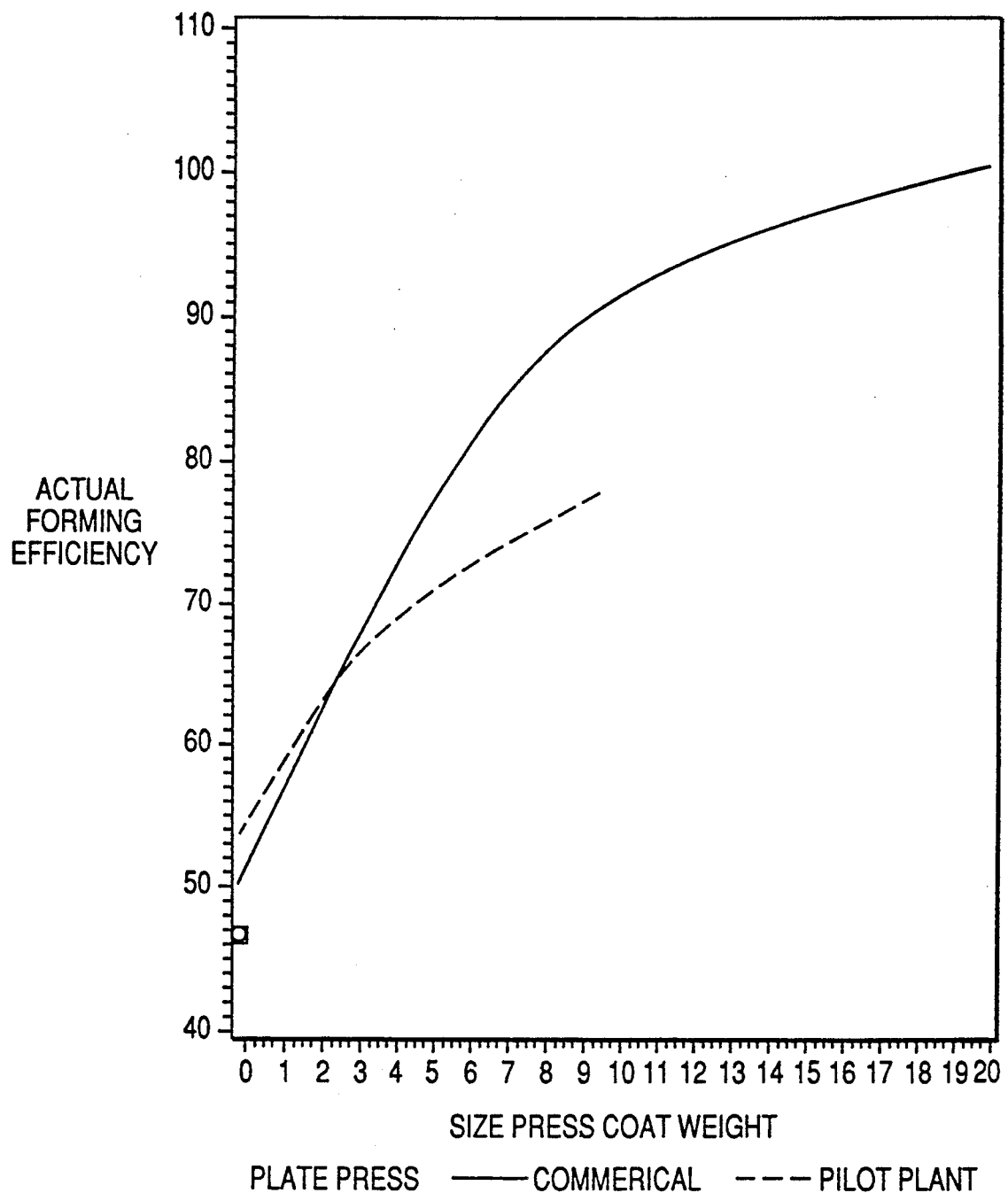
FIGS. 9-12 illustrate the improvement in rigidity resulting from the use of high levels of sizing adhesive in accordance with the present invention.

In FIG. 9, the forming efficiency of plates formed as described herein as a function of the amount of starch applied in the size press are plotted. By forming efficiency it is meant the ratio between the actual strength of the plate and the calculated strength that a pleatless plate, or a plate with perfectly bonded pleats, having the physical properties of the unsized board, would have as calculated by finite element analysis. It can be seen that the forming efficiency of plates having normal amounts of starch, say up to 3 or 4 lbs/ream, is under 80%; but that size press weights over about 6 lbs/ream produce forming efficiencies approaching and even in excess of 90%. It should be noted that FIG. 9 combines data obtained from both commercial and pilot scale equipment, the results from commercial scale equipment being indicated by the solid line and the pilot scale by the interrupted line. Experience shows that results obtained on the pilot scale equipment at lower size press weights are comparable to those obtained on commercial scale equipment, but that at higher weights, the pilot scale equipment produces plate forming efficiencies which are low. Thus the forming efficiencies in excess of 100% as indicated in FIG. 9 may be the result of the effect of the sizing adhesive on the tensile stiffness properties of the board, forming efficiency being calculated on the basis of properties of unsized board before forming. Press drying effects may also lead to improvements in the properties of the board.

Figure 10:
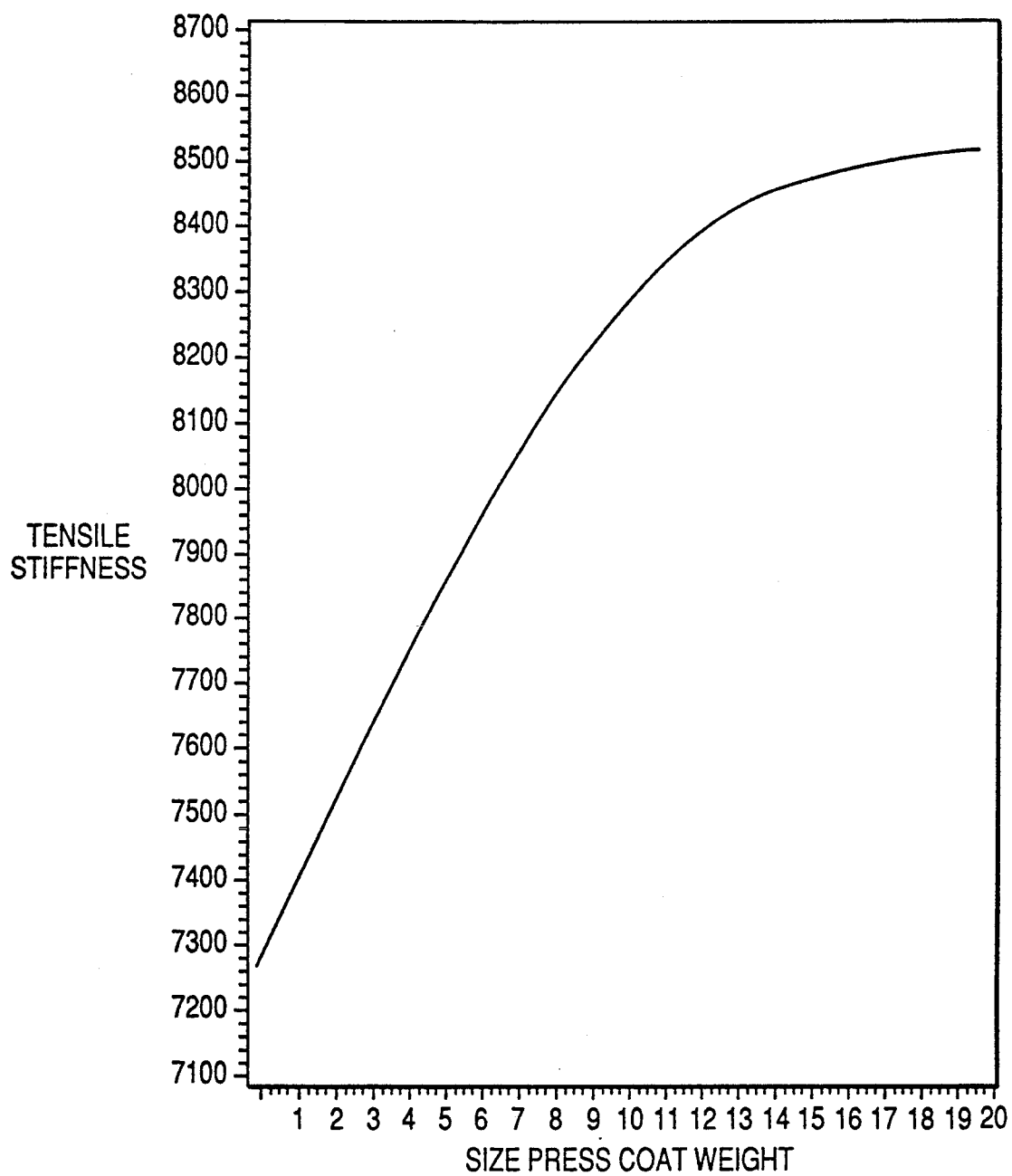

FIG. 10 reports the tensile stiffness of the board in pounds per inch of width as a function of the amount of sizing adhesive applied. It can be seen that actual tensile stiffness of the board is increased by less than about 20% as the amount of sizing adhesive is increased from 0 to about 20 lbs/ream.

Figure 11:
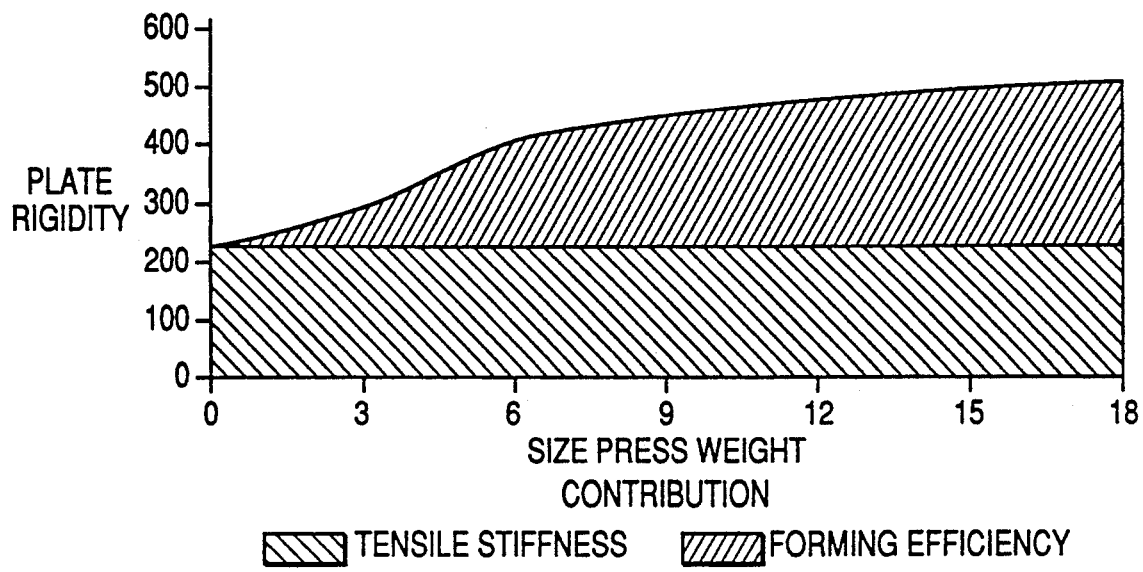

FIG. 11 illustrates the effect of the amount of sizing adhesive applied on plate rigidity in grams measured in accordance with the Single Service Institute procedure for measurement of plate rigidity. It shows as well the relative contribution made by better pleat bonding as compared to the calculated contribution due to increased tensile stiffness of the boardstock. FIG. 11 dramatically illustrates the point that the increase in plate rigidity cannot be explained based upon the change in the strength properties of the boardstock due to the increased amount of sizing adhesives used in the practice of the present invention.

Figure 12:
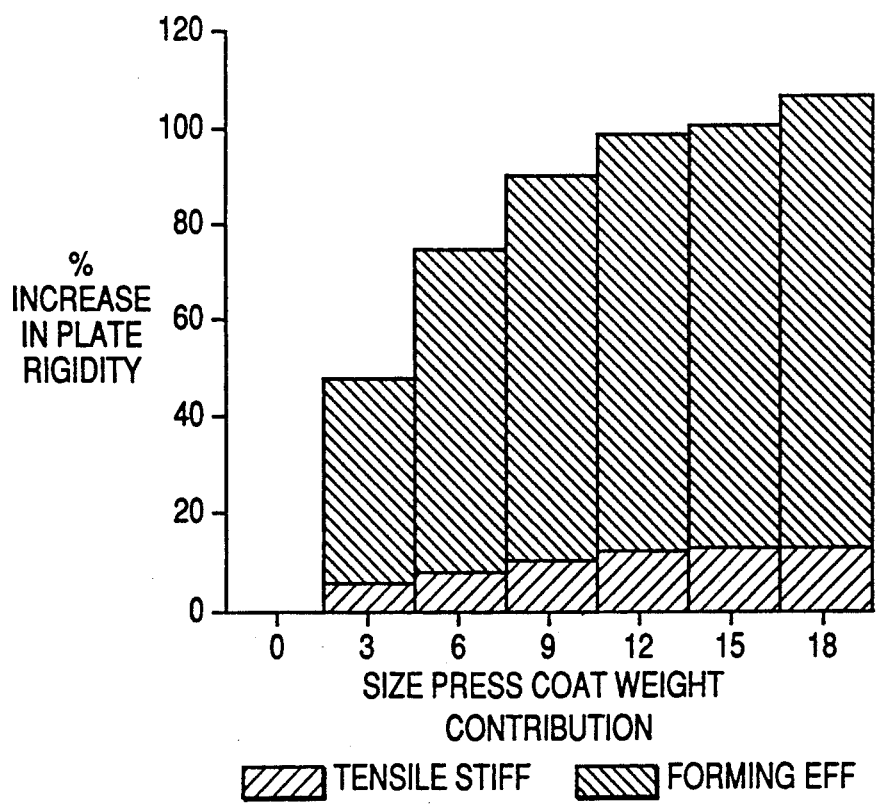

FIG. 12 illustrates the calculated percentage increase in plate rigidity attributable to the effect of the amount of sizing adhesive applied on the tensile properties of the board neglecting the improvement in pleat bonding as compared to the percentage increase in plate rigidity attributable to the effect of improved pleat bonding and thus shows the relative contribution made by better pleat bonding as compared to the calculated contribution due to increased tensile stiffness of the board as determined using a finite element technique. The calculated effect of each was based upon correlation derived from a large number of experiments in which the effects of variation in each were observed.

While the present invention has been described with reference to a preferred embodiment, it will be appreciated by those skilled in the art that the invention may be practiced otherwise than as specifically described herein without departing from the spirit and scope of the invention. It is, therefore, to be understood that the spirit and scope of the invention be limited only by the appendant claims.

Industrial Applicability

Containers formed in accordance with the foregoing description may be manufactured by existing manufacturing assemblies with only minor changes being made to the configuration of the dies of the die forming press and the additional application of starch at the size press during the formation of the paperboard stock. The container set forth herein above may be circular as in a plate or bowl, or it may be square or rectangular with annular corners such as a tray. Other shapes are contemplated including compartmented trays or plates as well as oval platters.

We claim:

1. A container, having a finished diameter D, formed from a blank, said container comprising:
    a substantially planar inner region;
    a sidewall region including;
    a generally annular region flaring upwardly and outwardly from a periphery of said planar inner region and a first frusto-conical region adjoining said annular region, said first frusto-conical region sloping outwardly and upwardly from said annular region; and
    a rim region including an outwardly flaring arcuate annular region adjoining an outer periphery of said first frusto-conical region having a first portion thereof extending generally upwardly from said first frusto-conical region and a second portion thereof flaring generally downwardly at an angle between about 6° to about 12° relative to a plane defined by said planar inner region, a second frusto-conical region extending downwardly and outwardly from said second portion of said arcuate annular region at an angle of about 6° to about 12° relative to a plane defined by said planar inner region and a lip portion extending outwardly and downwardly from said second frusto-conical region at an angle greater than 45° with respect to said plane.

2. A container as defined in claim 1, wherein said first frusto-conical region extends at an angle from about 55° to about 70° relative to the plane defined by said substantially planar inner region.

3. A container as defined in claim 1, wherein said first frusto-conical region has a length greater than about 0.015 D.

4. A container as defined in claim 1, wherein said outwardly flaring arcuate annular region includes a radius of curvature between about 0.015 D and about 0.030 D.

5. A container as defined in claim 1, wherein said second portion of said outwardly flaring arcuate annular region flares generally downwardly at an angle of approximately 6°–10.5°.

6. A container as defined in claim 1, wherein said second frusto-conical region extends downwardly at an angle of approximately 6°–10.5°.

7. A container as defined in claim 1, wherein said lip portion includes an outwardly and downwardly flaring frusto-conical portion adjoining an outer-periphery of said second frusto-conical region, said lip having a length of at least 0.005 D.

8. A container as defined in claim 1, wherein said lip extends downwardly at an angle between about 15° to about 30° relative to a central axis of said planar inner region.

9. A container as defined in claim 8, wherein said lip extends downwardly at an angle of approximately 22.5° relative to the central axis of said planar inner portion.

10. A container as defined in claim 1, further comprising a plurality of pleats extending through said sidewall and rim regions and a stiffening means for stiffening said container by increasing the resistance of said pleats to opening.

11. A container as defined in claim 10, wherein said stiffening means includes a means for increasing bonding internal to the paperboard adjoining said plurality of radially extending pleats formed in said sidewall and rim regions.

12. A container as defined in claim 11, wherein the blank is formed of a paperboard material impregnated with a sizing adhesive in an amount at least the equivalent of 6 lbs. of starch per 3000 ft$^2$ ream.

13. A container as defined in claim 12, wherein the blank is impregnated with said sizing adhesive in an amount equivalent to 9–20 lbs. of starch per 3000 ft$^2$ ream.

14. A container integrally formed of paperboard stock material comprising;
    a substantially planar inner region;
    a sidewall region flaring upwardly and outwardly from a periphery of said planar inner region;
    an outwardly flaring rim region; and
    a plurality of substantially radially extending pleats formed in and extending through said sidewall and said rim region,
    wherein said paperboard material is impregnated with a predetermined amount of sizing adhesive such that said pleats are bonded together to provide sufficient resistance to pleat opening in said sidewall and said rim regions that the container exhibits rigidity and strength substantially equivalent to that of a pleatless container having the same composition and geometric configuration.

15. A container as defined in claim 14, wherein said predetermined amount of sizing adhesive is at least the equivalent of 6 lbs. of starch per 3000 ft$^2$ ream of paperboard stock.

16. A container as defined in claim 15, wherein said predetermined amount of starch is the equivalent of 9–20 lbs. of starch per 3000 ft$^2$ ream.

17. A container as defined in claim 16, wherein said predetermined amount of sizing adhesive is the equivalent of 13 lbs. of starch per 3000 ft² ream.

18. A container as defined in claim 14, wherein said sidewall region comprises a generally annular region flaring upwardly and outwardly from a periphery of said planar inner region and a first frusto-conical region adjoining said annular region, said first frusto-conical region sloping outwardly and upwardly from said annular region; and said rim region comprises an outwardly flaring arcuate annular region adjoining an outer periphery of said first frusto-conical region having a first portion thereof extending generally upwardly from said first frusto-conical region and a second portion thereof flaring generally downwardly at an angle between about 6° to about 12° relative to a plane defined by said planar inner region and a second frusto-conical region extending downwardly and outwardly from said second portion of said arcuate annular region at an angle of about 6° to about 12° relative to a plane defined by said planar inner region.

19. A container as defined in claim 18, further including a lip region extending outwardly and downwardly from said second frusto-conical region at an angle greater than 45° with respect to said plane.

20. A container as defined in claim 18, wherein said second portion of said outwardly flaring arcuate annular region flares generally downwardly at an angle of approximately 6°–10.5°.

21. A container as defined in claim 18, wherein said second region extends downwardly at an angle of approximately 6°–10.5°.

22. A container as defined in claim 14, wherein said container has at least 80% of the strength of a pleatless container having the same composition and geometric configuration.

23. A container as defined in claim 14, wherein said container has at least 90% of the strength of a pleatless container having the same composition and geometric configuration.

24. A container as defined in claim 14, wherein the load required to produce a deflection of 0.5 inch in accordance with the SSI rigidity test is at least 80% of the load required to produce that deflection in an equivalent pleatless container having the same composition and geometric configuration.

25. A container as defined in claim 14, wherein the load required to produce a deflection of 0.5 inch in accordance with the SSI rigidity test is at least 90% of the load required to produce that deflection in an equivalent pleatless container having the same composition and geometric configuration.

26. A container, having a finished diameter D, formed from a blank, said container comprising:
a substantially planar inner region; and
a sidewall region comprising, a generally annular region flaring upwardly and outwardly from a periphery of said planar inner region, and a first frusto-conical region adjoining said annular region, said first frusto-conical region sloping outwardly and upwardly from said annular region;

a rim region comprising an outwardly flaring arcuate annular region adjoining an outer periphery of said first frusto-conical region having a first portion thereof extending generally upwardly from said first frusto-conical region and a second portion thereof flaring generally downwardly at an angle between about 6° to about 12° relative to a plane defined by said planar inner region and a second frusto-conical region extending downwardly and outwardly from said second portion of said arcuate annular region at an angle of about 6° to about 12° relative to a plane defined by said planar inner region;

a plurality of radially extending pleats formed in at least said first frusto-conical region, said outwardly flaring arcuate annular region and said second frusto-conical region; and a lip portion extending outwardly and downwardly from said second frusto-conical region at an angle of at least about 45° relative to the plane defined by said planar inner region;

wherein said blank is formed of a paperboard material impregnated with predetermined amount of a sizing adhesive in an amount equal to at least 6 lbs. of starch per 3000 ft² ream.

27. A container as defined in claim 26, wherein said first frusto-conical region extends at an angle from about 55° to about 70° relative to the plane defined by said substantially planar inner region.

28. A container as defined in claim 26, wherein said first frusto-conical region has a length greater than about 0.015 D.

29. A container as defined in claim 26, wherein said outwardly flaring arcuate annular region includes a radius of curvature between about 0.015 D and about 0.030 D.

30. A container as defined in claim 26, wherein said second portion of said outwardly flaring arcuate annular region flares generally downwardly at an angle of approximately 6°–10.5°.

31. A container as defined in claim 26, wherein said second frusto-conical region extends downwardly at an angle of approximately 6°–10.5°.

32. A container as defined in claim 26, wherein said lip has a length of at least 0.005 D.

33. A container as defined in claim 26, wherein said lip extends downwardly at an angle between about 15° to about 30° relative to a central axis of said planar inner region.

34. A container as defined in claim 26, wherein the blank is impregnated with the equivalent of 9–20 lbs. of starch per 3000 ft² ream.

35. A container as defined in claim 34, wherein said predetermined amount of sizing adhesive is the equivalent of 13 lbs. of starch per 3000 ft² ream.

* * * * *

UNITED STATES PATENT AND TRADEMARK OFFICE
CERTIFICATE OF CORRECTION

PATENT NO. :   5,326,020
DATED      :   July 5, 1994
INVENTOR(S):   Cheshire, et al.

It is certified that error appears in the above-identified patent and that said Letters Patent is hereby corrected as shown below:

<u>Title Page</u>: Item [73]

Change "Assignee:  James River Corporation of America" to --Assignee

James River Corporation of Virginia--.

Signed and Sealed this

Twenty-seventh Day of September, 1994

Attest:

BRUCE LEHMAN

Attesting Officer    Commissioner of Patents and Trademarks